United States Patent

[11] 3,543,750

| [72] | Inventor | James Meizanis<br>Somerville, New Jersey |
|---|---|---|
| [21] | Appl. No. | 697,947 |
| [22] | Filed | Jan. 15, 1968 |
| [45] | Patented | Dec. 1, 1970 |
| [73] | Assignee | Johnson & Johnson<br>a corporation of New Jersey |

[54] PERFORATE FILM DRESSING AND METHOD OF MAKING SAME
14 Claims, 6 Drawing Figs.

[52] U.S. Cl. .................................................. 128/156,
128/154, 161/131
[51] Int. Cl. ................................................ A61f 15/00
[50] Field of Search .................................... 128/155,
156, 157, 580, 296; 156/152, 158; 161/; 117/122

[56] References Cited
UNITED STATES PATENTS

| 2,667,436 | 1/1954 | Goepfert et al. | 117/122P |
|---|---|---|---|
| 2,688,581 | 9/1954 | Stubbs | 156/249 |
| 2,896,618 | 7/1959 | Schaefer | 128/156 |
| 3,245,855 | 4/1966 | Stenvall | 156/152 |
| 3,292,619 | 12/1966 | Egler | 128/156 |

Primary Examiner—Adele M. Eager
Attorneys—Alexander T. Kardos, Arnold S. Worfolk and Harold L. Warner ABSTRACT: Dressings having a low degree of adhesion to healing wound surfaces are prepared in which the wound-contacting surface is an undulating surface of a perforate film having hills and valleys with the perforations occurring in the valleys. The perforate film having the undulating surface is formed by printing an organosol, such for example as polyvinyl chloride organosol, on a carrier in an open-mesh pattern and then heating the printed organosol to fuse the plastic and remove solvent therefrom.

Patented Dec. 1, 1970
3,543,750
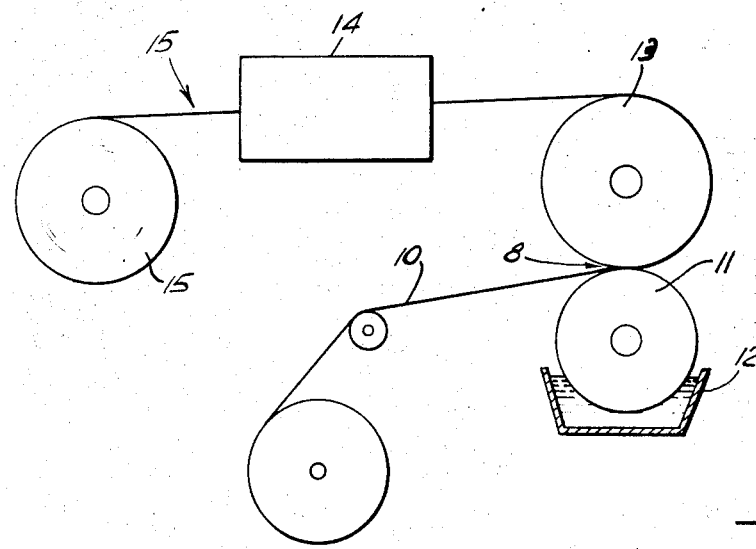
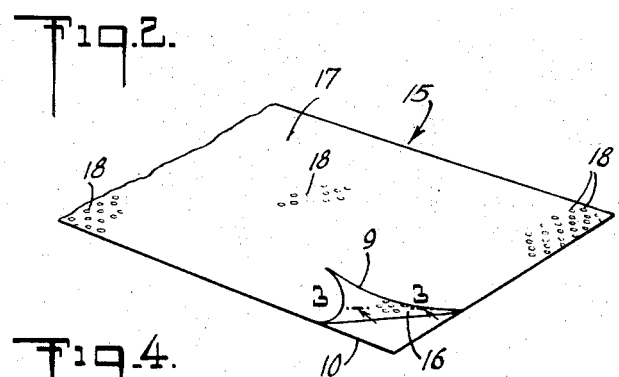
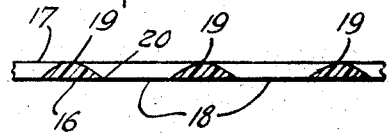
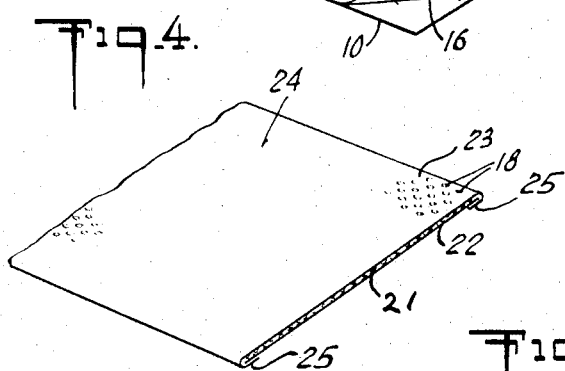
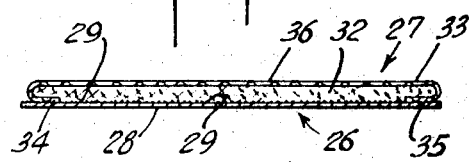
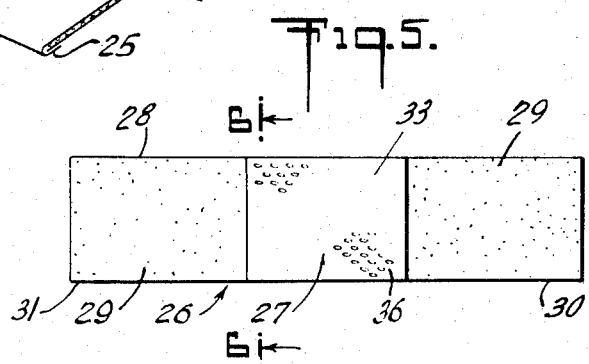
INVENTOR
JAMES MEIZANIS
BY
Harold L. Warner
ATTORNEY 3,543,750

PERFORATE FILM DRESSING AND METHOD OF MAKING SAME

The present invention relates to flexible fluid-permeable films and the method of making the same. The flexible fluid-permeable films of the present invention are particularly suitable as the wound-contacting surface of dressings adapted to be placed in contact with healing wounds where a relatively nonadherent dressing is desired, the invention includes dressings of composite structure containing such flexible fluid permeable films together with an absorbent.

It has been recognized that in the natural healing of animal wounds, the dressing serves primarily as a protection for the wound during the healing process. The problem with gauze and similar fibrous absorbent dressings is that during the healing process the eschar tends to form or grow around parts of the dressing, thus making is difficult to later remove the dressing without tearing the eschar or scab and thus delaying the healing process. In order to overcome this, it has heretofore been proposed to use a smooth, thin, flexible, nonwater soluble film in direct contact with the wound. The film, which may be made of any smooth flexible material, is perforated or cut to permit passage of fluids through the film to an absorbent backing. Dressings have been proposed wherein the flexible, nonwater soluble, perforated is bonded to or wrapped around an absorbent pad. Dressings of this type are described, for example, in the British Pat. No. 439,085 to Gelinsky, specification acceptance dated Nov. 28, 1935, and the French Pat. No. 947,609, to Weber published July 7, 1949.

Where the openings are made in the film by cutting, there is a tendency for the cut to remain closed until there is some movement to separate the edges in the area of the cut and permit fluids to pass through. As a result fluids can be expected to move more readily through perforate films having permanent openings particularly where little movement of the film is encountered. Heretofore perforate films of the permanent opening type have been prepared either through the use of punching dies, whereby the area of perforation is formed by cutting out and removing sections of the film, or by localized heating of thermoplastic films through the use of heated pins or heated gases whereby the film, in the area where the perforation is to be formed, is caused to flow laterally from the heated area to form the openings. With such perforation processes there is a substantial waste of film as sufficient film-forming material must be used to first form an imperforate film with the film-forming material then being removed from the areas of perforation. Also, where perforation is done by heating, and causing the film to move laterally in the perforated area, an annulet of film is formed around the perforation forming essentially a small dam around the edge of the opening through which the fluids must pass to reach the backing absorbent.

It is an object of the present invention to form perforate flexible films which are ideally suited for use as the wound-contacting surface in nonadherent dressings in which the amount of film-forming material utilized is substantially less than that heretofore needed in forming perforate film facings. It is a further object of the present invention to form perforate flexible films wherein the angle of fluid contact with the film surface in the area surrounding the perforation is small with the surface of the film sloping to the perforation. It is a still further object of the present invention to provide a process for forming perforate flexible films using a minimum of film-forming material. These and other objects and advantages of the present invention will become apparent from the following description taken in connection with the accompanying drawings wherein are set forth by way of illustration and example certain embodiments of the invention.

Referring to the drawings,

FIG. 1 is a schematic view of apparatus illustrating production of film of the present invention;

FIG. 2 is a section of perforate film supported on a flexible carrier;

FIG. 3 is a cross-sectional view taken along line 3–3 of FIG. 2 through the perforate film;

FIG. 4 is a dressing utilizing the perforate film illustrated in FIGS. 2 and 3; and FIG. 5 is an adhesive bandage incorporating the present invention; and FIG. 6 is a cross-sectional view taken along line 6–6 of FIG. 5.

The perforate films of the present invention are prepared by printing an organosol of film-forming polymer onto a carrier in the form of an open-mesh or screen pattern and then curing the printed organosol to remove the solvent therefrom and set the resin. Curing is done by passing the printed reticular pattern through a drying oven of conventional construction. The carrier, onto which the organosol is printed, may be any of the conventional carriers utilized in the forming of films by solvent casting of the resin from which the film is formed.

The pattern of printing may be any reticular pattern such as formed by crossing lines, the spacing between the crossing lines determining the size of the perforations to be formed in the final film. The lines of printed organosol may be either at right angles to each other or may cross each other at an angle such as to give a diamond pattern in the open areas between the crossing printed lines. On heating the printed organosol to remove solvent therefrom and set the resin, the resin tends to flow towards the open spaces between the lines of the printed screen pattern with the result that the cured printed film is substantially thicker in the areas between the perforations decreasing in thickness as the edge of the perforation is approached. This results in the surface of the film, which is not in contact with the support onto which the plastisol was printed, having an undulating appearance of hills and valleys with the perforations occurring in the valleys. This also provides a film in which the angle of liquid contact on the undulating surface in the area around the perforations is substantially less than the angle of contact that exists where perforations are formed in a film by punching.

The thickest portion of the reticular film, where the same is to be used as a dressing, generally has a thickness in the range of about 0.5 mil to 6 mils the thickness tapering off as it approaches the periphery of the openings to the point where no film remains. The perforations in the film should be present in sufficient number to permit ready passage of excretions from the body surface covered into the absorbent backing. It is generally preferred that the perforations have an open area equivalent to a circle having a diameter of about 0.01 to 0.2 inch and be present in sufficient number and so dispersed as to provide for each square inch of film an open area of at least 0.0075 square inch, the open area preferably being within the range of 0.1 to 0.4 square inch per square inch of film.

One of the film-forming polymer compositions found to be particularly useful in the formation of such perforate flexible films are the plasticized polyvinyl chlorides and polyvinyl chloride copolymers, although any film-forming polymer or polymer plasticizer composition from which nonirritating flexible films can be formed may be used, the same being printed as a plastisol or an organosol in forming the open-mesh pattern.

As the polyvinyl chloride polymers are preferred, the polyvinyl chloride polymers will be used in the following more detailed description of the practice of the present invention.

Referring to FIG. 1, the flexible perforate film 9 is formed by printing onto a carrier paper 10 a plastisol of plasticized polyvinyl chloride film through means of a printing roll 11. The printing roll 11 is similar to that found in common printing equipment except that a basic difference between this roll 11 and a common printing roll lies in the depth of engraving. In roll 11 the engraving is preferably within the range of about 0.008 inch to 0.010 inch in depth. However, the range in depth may vary between about 0.002 to 0.020 inch if thicker or thinner films are desired. The thinner films, however, are somewhat weaker while the thicker films are less flexible for any specific polymer used. Another difference is that the recessed portion of roll 11 is the greater percentage of the total surface area. The raised pins which define the holes to be formed in the final film form a minor percentage of the surface area. In the schematic illustration given, the printing roll 11 dips into a container 12 of organosol and the organosol, which is carried by the printing surface of the roll 11, is then deposited on the carrier support 10 as it passes between the nip 8 of printing roll 11 and backup roll 13. Backup roll 13 is of the conventional type used in printing processes, the same having a relatively smooth hard rubber surface. After passing through the nip 8 between rolls 11 and 13, wherein the organosol is printed on the carrier 10, the carrier 10 with the open-mesh screen of plastisol printed thereon is passed through a heated oven 14 operated at a temperature of about 350° to 450° F. for setting the resin and driving off the solvent.

The carrier 10 with the cured polyvinyl chloride film thereon is collected on roll 15 from which the same may be removed for later use.

In FIG. 2 is illustrated a section of carrier sheet 10 with the cured perforate polyvinyl chloride film 9 thereon after the same has come out of the oven 14. A section of the perforated film 9 is shown in cross section in FIG. 3. It will be noted that the side 16 of the film 9 which was in contact with the carrier sheet 10 assumes the surface characteristics of the carrier sheet which is essentially smooth and even. The opposite side 17, however, of the film 9 is undulating. The film 9 is thickest in the areas midway between the perforations 18 with the result that the undulating surface 17 of the film is composed of hills 19 and valleys 20, the perforations 18 falling within the valleys 20. Because of the thickness of the film 9 in the hill areas 19, the reticular film 9 has substantial strength. The sloping sides of the hills 19 down to the edges of the perforations 18 present a small contact angle for any fluids striking this surface offering little resistance to flow into the area occupied by the perforations 18. Also, as the thicker portion forming the hills 19 provides a strengthening lattice with the thickness of the film rapidly decreasing as the edges of the perforations are approached, a reticular film is obtained of appreciable strength but using substantially less polymer than would be needed to prepare a perforate film of the same open area by the prior methods of punching or using heated pins. In fact, a saving of as much as about 50 percent of film-forming polymer can be realized by practicing the present invention.

In forming protective dressings using the perforate film in combination with a backing absorbent, the relatively flat surface 16 of the film is placed against the absorbent backing with the undulating surface being exposed for placing over a wound. A dressing formed in this manner is illustrated in FIG. 4.

Referring to FIG. 4, an absorbent 21 such as cellulose wadding or an absorbent pad formed of interlocked or interbonded cellulosic fibers, is contained between a backing 22 and a facing 23. The facing 23, which is the wound-contacting surface of the dressing, is formed of a perforate film of the type heretofore described and illustrated, for example, in FIG. 3. The smooth surface of the facing film 23 is placed in contact with the absorbent 21. The upper undulating surface of the film is the exposed surface 24 of the film facing 23 and is the surface which would contact a wound when the dressing is in use. It is thus apparent that with the sloping edges around the perforations, a minimum of resistance is offered to flow of fluids through the perforations 18 to the backing absorbent. In the particular construction illustrated in FIG. 4, the film 23 is wider than the absorbent 21 and is wrapped around two opposing edges of the dressing, the overlapping edges 25 being secured to the backing 22 to complete the composite dressing.

In FIG. 5 an adhesive bandage 26 is illustrated in which the absorbent pad 27 of the adhesive bandage is made in accordance with the present invention. Referring to FIG. 5, the adhesive bandage 26 comprises a flexible backing strip 28 containing an adhesive coating 29. In the center of the flexible backing and secured to the pressure sensitive adhesive coating thereon is an absorbent pad 27, the backing 28 extending beyond two opposite sides of absorbent pad 27 to form adhesive tabs 30 and 31. Referring to FIG. 6, which is a cross-sectional view taken along line 6–6 of FIG. 5 through the absorbent pad 27, it will be noted that the absorbent pad comprises an absorbent 32 having a film 33 covering the same. The film 33 extends around two ends of the absorbent pad 27 the edges 34 and 35 of the film 33 being secured to the underlying adhesive 29 together with the absorbent 32. The film 33 is of similar construction to that illustrated in FIGS. 2 and 3 having one undulating surface and another relatively flat surface. The relatively flat surface is placed in contact with the underlying absorbent while the undulating surface 36 is the exposed surface of the pad, this surface being the surface adapted to be placed in contact with a wound when the bandage is used.

The practice of the invention is further described by the following example which is given for purposes of illustration only, the invention not being limited thereto:

EXAMPLE

Using a printing roll, an organosol is printed on a release-coated carrier paper in an open screen pattern and then cured. The printing surface of the printing roll has a raised diamond pattern formed by crossing etched lines of 0.008 to 0.01 inch in depth. The raised area of the surface of the roll comprises 16 percent of the total roll surface with the depressed area comprising about 84 percent. The raised area being formed of pins of size approximately one thirty-second inch square spaced about one-sixteenth of an inch apart.

The organosol contains a dispersion grade plasticized polyvinyl chloride in xylene solvent and has a viscosity of 12,000 to 13,000 centipoises. The paper carrier used may be any of the conventional carriers used for casting polyvinyl chloride films.

After printing of the organosol on the carrier the same is passed through a three-zone oven having temperature zones of 140°, 280°, and 400° F., the carrier with organosol passing through the zones starting with the lower zone. The total curing time is about 3 minutes.

On removal from the oven the carrier paper contains a cured reticular flexible polyvinyl chloride film similar to the type heretofore described. The thickness of the film at the peak points is 0.004 of an inch decreasing to zero at the edge of the perforations. The open areas are approximately square in shape having edge dimension of about 30 mils. The total open area is about 14 percent of the film. The reticular polyvinyl chloride film so formed is removed from the carrier and placed, flat surface down, onto an absorbent pad formed of interbonded cellulose fibers. The reticular polyvinyl chloride film is wrapped around the absorbent pad and secured to the back side thereof by adhesive. Dressings so formed are placed on excision wounds formed on test animals to determine the release qualities of the dressing. The dressings are found to have, in comparative tests, good release characteristics, the same being equal to if not slightly better than release dressings made by conventional film perforation methods.

Absorbency tests are also made in which drops of fluid, of similar viscosity to blood, are placed on the wound-contacting surface of the dressing. In these comparative tests the dressings of the present invention are found to give more complete absorption then similarly prepared dressings used films prepared by conventional perforation methods.

Particular embodiments of the invention have been used to illustrate the same. The invention, however, is not limited to these specific embodiments. In view of the foregoing disclosure, variations and modifications thereof will be apparent. It is intended to include within the invention all such variations and modifications except as do not come within the scope of the appended claims.

I claim:

1. A dressing having a reticular film facing one side of which is adapted to be placed in contact with a wound, said wound-contacting side having an undulating surface of hills and valleys with openings extending through said film in said valleys, said hills constituting the portions of the wound-contacting side which make contact with said wound and also constituting the tallest areas of said film above said openings.

2. A dressing of claim 1 in which said film varies in thickness with the greatest thickness of said film occurring in the areas of said hills about midway between said openings and the least thickness at the edge of said openings, the thickness in the area of said hills being several times the thickness at the edge of said openings.

3. A dressing as defined in claim 2 in which the surface of said film is substantially flat on the side opposite to the wound-contacting side.

4. A dressing of claim 3 in which said film is formed of a thermoplastic polymer.

5. A dressing of claim 4 in which said film is formed of plasticized polyvinyl chloride.

6. A dressing as defined in claim 4 in which the substantially flat and centrally located surface of said film is in intimate but detached contact with an absorbent.

7. A dressing of claim 6 in which said absorbent is of cellulosic fibers.

8. A dressing comprising a flexible backing, a flexible reticular facing of thermoplastic film and an absorbent pad between said film facing and said backing, the exposed side of said film having an undulating surface of hills and valleys with openings extending through said film in said valleys, said hills constituting the portions of said exposed side which make contact with the skin of a person and also constituting the tallest areas of said film above said openings.

9. A dressing of claim 8 in which said backing is a flexible sheet of greater dimension than said pad and having a portion thereof extending beyond opposed edges of said pad and containing a pressure-sensitive adhesive coating thereon for securing said dressing on a patient.

10. A dressing as defined in claim 8 in which said thermoplastic film is formed of plasticized polyvinyl chloride and varies in thickness with the greatest thickness of said film occuring in the area of said hills about midway between said openings and the least thickness at the edges of said openings, the thickness in the area of said hills midway between said openings being several times the thickness at the edges of said openings, the intermediate portion of said film being in intimate but detached contact with said absorbent, the surface in contact with said absorbent being substantially flat.

11. The method of forming reticular plastic film comprising printing a fluid composition of thermoplastic polymer onto a carrier in a reticular pattern, heating said carrier with said printed composition thereon to fuse said polymer into a reticular plastic film and removing said reticular plastic film from said carrier.

12. The method of claim 11 wherein said fluid composition is an organosol of plasticized polyvinyl chloride.

13. The method of making a perforate film dressing comprising partially submerging a cylindrically shaped roller having an engraved open-mesh screen on its outer round surface into a container containing a fluid composition of a thermoplastic film material, contacting the outer unsubmerged round surface area of said roller with a carrier, advancing said carrier over said roller to thereby cause said roller to deposit on said carrier a film of thermoplastic film material in the engraved open-mesh pattern of said roller, advancing said carrier with its deposited film through a heated drying oven to thereby cure said deposited film, collecting said cured film from said oven, stripping said cured film from said carrier, and applying said cured film to an absorbent pad.

14. The method of claim 13 in which said open-mesh screen pattern on said roller includes raised pins which define the perforations to be formed in the final cured film, and said oven is a multistage oven having gradually increasing temperature zones through which said carrier and its deposited film travel in a direction from the lower temperature zone to the higher temperature zone.